United States Patent [19]

Kanbier et al.

[11] Patent Number: 4,579,629
[45] Date of Patent: Apr. 1, 1986

[54] APPARATUS FOR FRACTIONAL DISTILLATION UNDER VACUUM

[75] Inventors: Dirk Kanbier; Alfred L. Van Kleef, both of The Hague, Netherlands

[73] Assignee: Shell Oil Company, Houston, Tex.

[21] Appl. No.: 576,971

[22] Filed: Feb. 3, 1984

[30] Foreign Application Priority Data

Feb. 23, 1983 [GB] United Kingdom ................. 8305016

[51] Int. Cl.$^4$ .............................................. B01D 3/10
[52] U.S. Cl. ..................................... 202/205; 202/155; 202/186; 202/202; 202/235; 203/91; 203/100; 159/DIG. 16; 159/DIG. 41
[58] Field of Search .......................... 203/89, 100, 91; 202/236, 205, 202, 197, 186, 237, 235, 187, 162, 155, 153, 233, 245; 159/DIG. 41, DIG. 16, 13 R

[56] References Cited

U.S. PATENT DOCUMENTS

| | | | |
|---|---|---|---|
| 1,744,421 | 1/1930 | Stroud, Jr. et al. | 203/100 |
| 1,814,927 | 7/1931 | Hock | 159/DIG. 16 |
| 1,871,051 | 8/1932 | Franzen | 203/100 |
| 2,167,028 | 7/1939 | McGovern | 202/153 |
| 2,609,335 | 9/1952 | Hickman | 202/153 |
| 2,666,737 | 1/1954 | Hurd | 202/153 |
| 2,692,129 | 10/1954 | Wilson et al. | 202/153 |
| 2,695,870 | 11/1954 | Otto | 202/153 |
| 3,445,343 | 5/1969 | Popov | 261/148 |
| 4,217,176 | 8/1980 | Antony | 202/197 |
| 4,264,411 | 4/1981 | Almond, Jr. | 202/197 |
| 4,482,431 | 11/1984 | Voorhees | 202/197 |

FOREIGN PATENT DOCUMENTS 066790 12/1982 European Pat. Off. .

Primary Examiner—S. Leon Bashore
Assistant Examiner—V. Manoharan

[57] ABSTRACT

An apparatus for fractional distillation under vacuum, comprising an evacuable vessel enclosing a first zone for liquid to be distilled, a second zone for distillate and a third zone for residue. The vessel is provided with a plurality of vertical tubular elements having side walls forming evaporator surfaces and being provided with inlet means at their upper ends for directing liquid to be distilled from the first zone towards the evaporator surface. Each hollow element surrounds at least partly a vertical cooling surface to cause condensation of vaporized liquid to form distillate, each hollow element being further provided with means for separately withdrawing distillate and residue from its interior into the second zone and the third zone, respectively. The vessel preferably consists of detachably interconnected wall portions.

16 Claims, 5 Drawing Figures 4,579,629

APPARATUS FOR FRACTIONAL DISTILLATION UNDER VACUUM

BACKGROUND OF THE INVENTION

The invention relates to an apparatus for fractional distillation under vacuum and more particularly, to an apparatus for film-type distillation under vacuum, also called molecular distillation. In film-type distillation the liquid to be distilled is caused to flow along an evaporator surface in a relatively thin film for partially vaporizing the liquid, the vaporized liquid is collected on a cooling surface for condensing said vapor to form liquid distillate. The distillate and residue, i.e., non-vaporized liquid, are collected separately and withdrawn from the apparatus.

The above type of distillation is particularly suitable for distilling heavy liquids with extremely high boiling points, and is normally conducted at pressures of only a few microns Hg absolute. This is a high vacuum compared with conventional vacuum distillation units operating at a few mm Hg absolute at least. Molecular distillation might therefore advantageously be applied for distilling residues from conventional vacuum distillation units. The known molecular distillation units, however, are less suitable for distilling the large quantities of liquid to be processed in the petrochemical and oil industry. Further, the known units are often too complicated for use in large, continuously operating refineries.

SUMMARY OF THE INVENTION

The object of the present invention is to provide an apparatus for fractional distillation under vacuum which apparatus is suitable for treating large quantities of liquid within a relatively short period.

The apparatus for fractional distillation under vacuum according to the invention thereto comprises a normally vertically extending evacuable vessel enclosing a first zone for liquid to be distilled, a second zone for distillate an their zone for residue. The vessel is provided with inlet means for supplying liquid to be distilled into the first zone, outlet means for discharging distillate and residue from the second zone and the third zone, respectively. The interior of the vessel is also provided with a series of substantially parallel, vertically extending hollow elements, each having a substantially rotation-symmetrical side wall forming an evaporator surface. Each of the hollow elements is provided with means at or near the upper end for directing liquid to be distilled from the first zone to the upper part of the inner surface of its side wall to cause partial vaporization of said liquid. Each hollow element in addition substantially concentrically surrounds at least partly a substantially vertically extending cooling surface to cause condensation of vaporized liquid to form distillate, each hollow element being further provided with means for separately discharging distillate and residue from the interior thereof into the second zone and the third zone, respectively.

In units for molecular distillation the evaporator surfaces and cooling surfaces should be arranged in close proximity to one another, so that molecules of vaporized liquid can easily pass from an evaporator surface to a cooling surface. The distance between a cooling surface and an evaporator surface is normally in the order of magnitude of only a few cm, for example 1-5 cm. By applying a very low pressure, the molecules will hardly hamper one another during their movement between the two different surfaces.

In order to enable the distillable components in the liquid to be treated to evaporate as much as possible, the liquid film to be produced on an evaporator surface should preferably be very thin, so that all the evaporable components in the liquid can easily evaporate from the liquid film, not being impeded by non-evaporable liquid components. Suitable liquid films should preferably have a thickness of only a few mm.

From the above it will be clear that although minor amounts of liquid could advantageously be treated by means of the known equipment for film-type distillation, problems arise when large bulks of liquid, such as heavy gas oil, have to be processed on a commercial scale.

The apparatus according to the invention is so designed that in a single vacuum vessel large amounts of liquid can be distilled without reducing the efficiency of the process.

In a suitable embodiment of the invention the various zones in the vessel are separated from one another by means of detachably mounted walls enabling a quick dismantling of the vessel for maintenance and repair work.

BRIEF DESCRIPTION OF THE DRAWINGS

The invention will be more easily understood from the following description of preferred embodiments when taken with reference to the accompanying drawings, in which.

DESCRIPTION OF PREFERRED EMBODIMENTS

Figure 1:
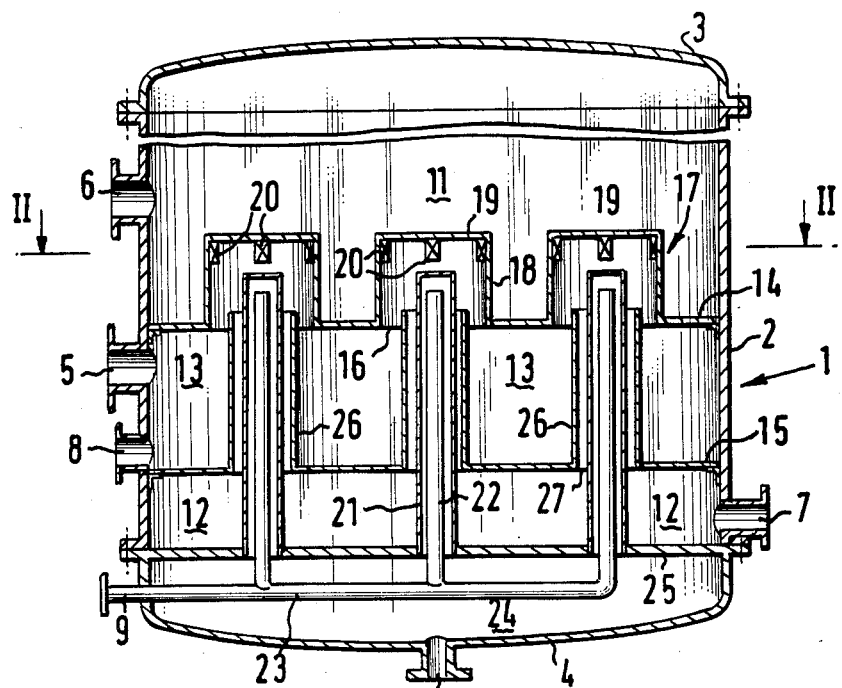
FIG. 1 shows a longitudinal section of a first embodiment according to the invention.

It should be noted that identical elements shown in the drawings have been indicated with the same reference numeral.

Figure 2:
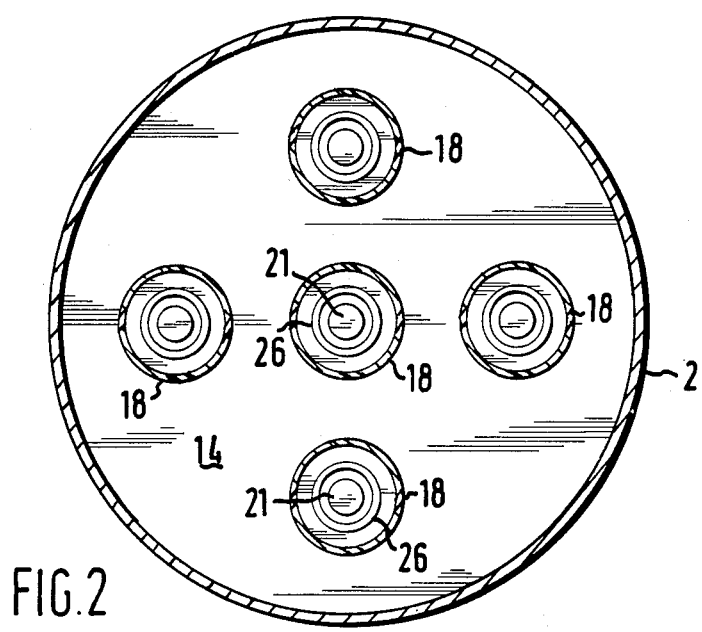
FIG. 2 shows a cross-section taken along the lines II—II in FIG. 1.

Referring to FIGS. 1 and 2, reference numeral 1 indicates a vertically extending vessel designed to withstand very low internal pressures. Vessel 1 preferably has a cylindrical side wall 2, a curved top or end wall 3 and a curved bottom or end wall 4 to meet the high strength requirements. As shown in FIG. 1 the curved top wall 3 and bottom wall 4 are detachably secured to the side wall 2 by means of flange connections. For depressurizing the interior of vessel 1, a tubular member 5 is inserted in the wall of said vessel, which member 5 is connected to pumping means capable of producing a vacuum within the vessel of below about 1 mm. Since such pumping means are known per se, and do not form part of the inventive idea, they have not been indicated in the drawings. The upper portion of the vessel 1 is provided with an inlet tube 6 for liquid to be distilled, while the lower portion of the vessel 1 is provided with outlet tubes 7 and 8 for discharging distillate and residue, respectively, from the vessel. The vessel 1 is further provided with an inlet 9 for supplying cooling fluid into the vessel and an outlet 10 for discharging said cooling fluid.

The interior of the vessel 1 is subdivided into three main zones, i.e., a first zone 11 for liquid to be distilled, a second zone 12 for collecting distillate, produced in distillation units described hereinafter, and a third zone 13 for collecting residue, i.e., the non-distilled part of the liquid. The zones 11, 12 and 13 are separated from one another by means of substantially horizontal first and seond walls 14 and 15 respectively, detachably mounted on supporting rings secured to the side wall 2 of the vessel 1.

The distillation units themselves are mounted in openings 16 of the upper horizontal wall 14. These units are formed by upwardly extending hollow elements 17 having a substantially cylindrical side wall 18, closed by a top wall or end cap 19 and being open at their lower ends. As shown in FIG. 2 the distillation units are substantially uniformly distributed over the cross section of vessel 1. The inner surfaces of the side walls 18 form the evaporator surfaces during operation of the apparatus shown. Each hollow element 17 is at its upper part provided with a plurality of substantially tangentially disposed openings 20, substantially uniformly distributed over the periphery of said side walls. These openings 20 form a fluid communication between the zone 11 for liquid to be distilled and the interior of the hollow elements 17. Further, each hollow element 17 surrounds the upper part of a cooling tube 21, arranged substantially concentrically with the associated element 17. The cooling tubes 21 are each provided with an open ended inner tube 22 for circulating cooling fluid through said tubes 21. The inner tubes 22 are connected to a cooling fluid inlet header 23, whereas the tubes 21 are connected to a cooling fluid outlet header or space 24. The inlet header 23 and outlet header 24 are in fluid communication with cooling fluid supply and discharge means (not shown) via the aforementioned cooling fluid inlet 9 and outlet 10, respectively. The cooling fluid outlet header or space 24, in which the inlet header 23 is arranged, is formed by the lowermost part of the vessel 1 and is confined in upward direction by a substantially horizontal wall 25, forming a separation between said outlet header or space 24 and the distillate zone 12.

For directing residue from the hollow elements 17 into the residue zone 13 and for directing distillate towards the distillate zone 12, the wall 15 is provided with upwardly extending boundary walls 26 mounted in openings 27 of the wall 15 and surrounding the cooling tubes 21. The upper ends of the boundary walls 26 terminate at or near the lower ends of the hollow elements 17, to prevent pollution of formed distillate by residue.

The operation of the above described apparatus for fractional distillation under vacuum is as follows. A high temperature liquid, such as, for example, hot short residue from a conventional vacuum column, is introduced into the vessel 1 via the inlet 6 for further treatment. The interior of the vessel 1 is maintained at a very low pressure, in the order of magnitude of 1/1000–1/10 mm Hg absolute, by pumping means connected to tubular member 5. The liquid to be treated is collected in the first upper zone 11, from which zone it subsequently flows through the openings 20 into the interior of the hollow elements 17. Due to the tangential direction of the openings 20, the incoming liquid is directed towards the inner surfaces of the side walls 18 and will subsequently flow in a whirling motion downwards along said side wall surfaces. Since the openings 20 are equally spaced around the side walls 18, substantially uniform distribution of liquid over the inner surfaces of said side walls 18 can be attained. The whirling motion of the liquid itself further promotes a uniform liquid film distribution over the side walls 18.

The temperature of the incoming liquid should be so chosen that upon flowing along the inner surfaces, hereinafter called evaporator surfaces, of the side walls 18, the lighter components in the liquid can evaporate. The necessary heat for evaporation is delivered by the non-evaporated part of the liquid. The vapor will pass towards the cooling tubes 21 and will subsequently condense upon the cooling surfaces of the cooling tubes 21 through which a cooling fluid is circulated via elongated elements or tubes 22. The distilled material will flow along the cooling tubes 21 into the distillate zone 12 and is subsequently recovered from vessel 1 via the distillate outlet 7. The non-distilled residual material drops downwardly from the inner surfaces of the side walls 18 and is collected into the residue zone 13. From this residue zone 13 the non-distilled liquid can be discharged via residue outlet 8. The non-distilled liquid can eventually be recirculated to the liquid zone 11 for a further treatment thereof. It should be noted that prior to such a recycling, the liquid should be reheated to the temperature required for at least partial distillation thereof.

The internals of the vessel 1 can be easily removed for inspection and cleaning by removing the vessel's top wall and lifting the trays 14 and 15 from the interior of the vessel.

Figure 3:
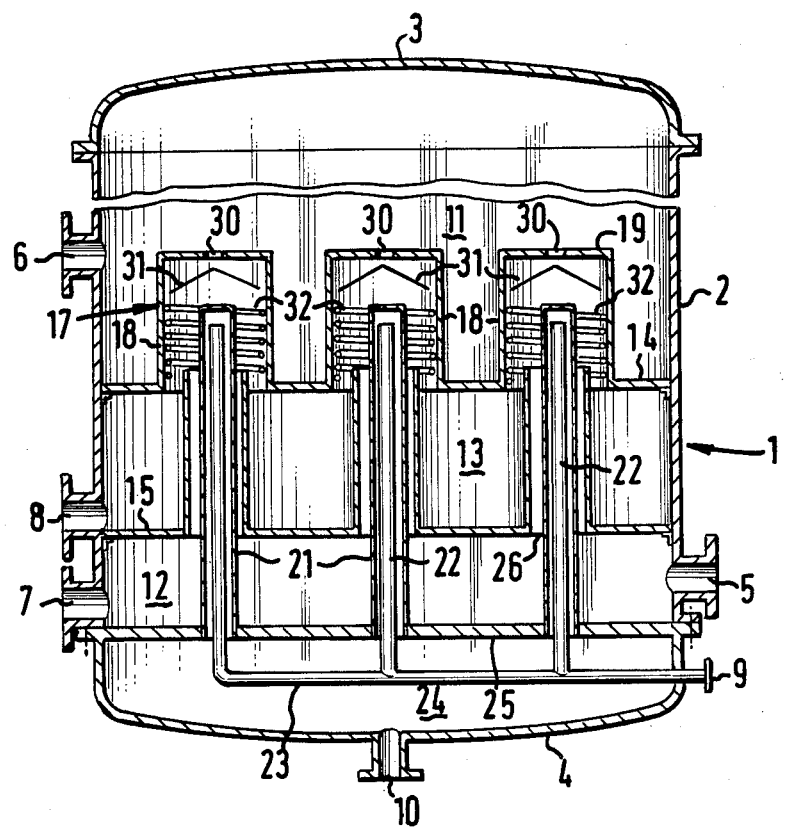
FIG. 3 shows a longitudinal section of a second embodiment according to the invention.

Reference is now made to FIG. 3 showing a further embodiment of a fractional distillation apparatus according to the invention. In this further embodiment the liquid inlet openings of the hollow elements 17 are formed by substantially centrally arranged openings 30 in the top walls or end caps 19. Directly below each opening 30 a conically shaped deflector element 31 is arranged which is held in place by means of, for example, spacers (not shown) connected to the top wall of the relevant hollow element 17. The inner surfaces of the side walls 18 are provided with helically wound coils 32, which coils serve to increase the available evaporator surface area formed by the inner side wall surfaces and further to guide the liquid flow. The coils 32 may be further used as means for heating the liquid to be distilled. In this latter case the coils 32 may be, for example, formed by electric resistance heating coils. For heating the liquid, it is also possible to apply hollow coils through which a heating fluid is circulated.

During operation of the vessel shown in FIG. 3 liquid to be distilled enters into the hollow elements 17 via the central openings 30 and is deflected towards the side walls 18 via the deflector elements 31. The liquid subsequently flows along the side walls over the coils 32. Since the coils are helically shaped they promote a uniform distribution of the liquid. If heating coils are present, the heat from said coils causes a partial evaporation of the liquid flowing along the coils. The use of heating coils enables the distillation of liquid entering the vessel with a relatively low temperature.

Figure 4:
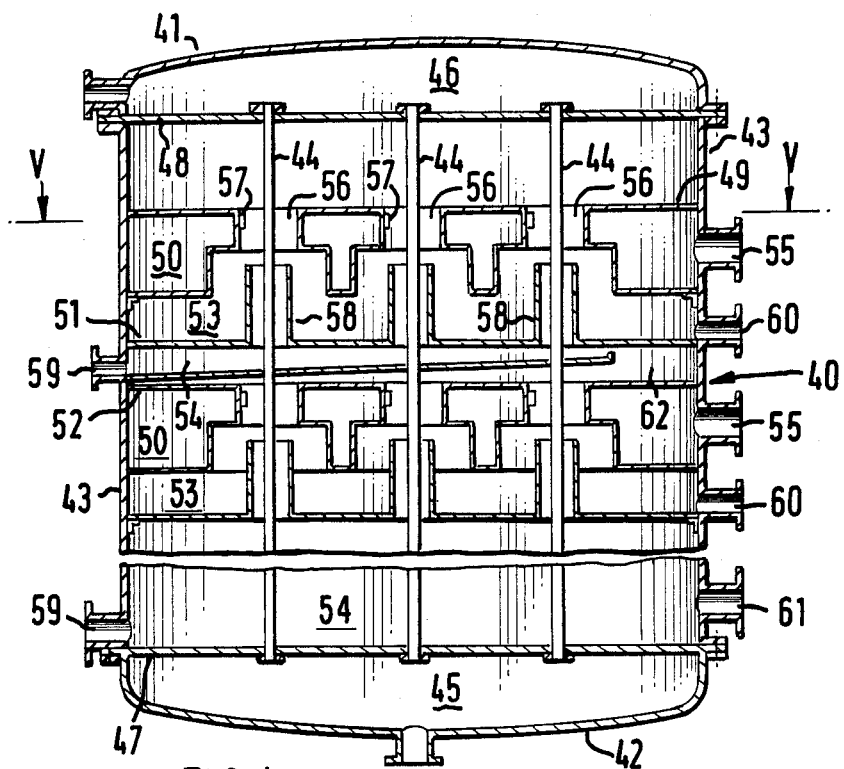
FIG. 4 shows a longitudinal section of a third embodiment according to the invention.
Figure 5:
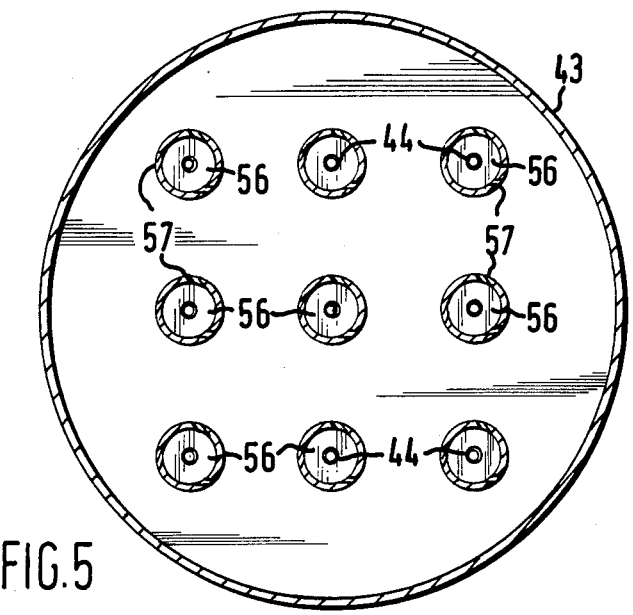
FIG. 5 shows a cross-section taken along the lines V—V in FIG. 4.

Reference is now made to the third embodiment of the invention shown in FIGS. 4 and 5. In these Figures a vessel 40 for vacuum distillation has been depicted which vessel is particularly suitable for distilling very large quantities of liquid. For this purpose the interior of the vessel 40 is provided with a plurality of horizontally arranged distillation unit decks positioned one above another as will be described hereinafter. To provide an easy accessibility the vessel has a top wall 41 and a bottom wall 42, both being detachably secured to the side wall 43 of the vessel.

The framework for the vessel internals is formed by a plurality of substantially vertically extending elongated elements or cooling tubes 44 running from a cooling fluid inlet header 45 in the lower part of the vessel 40 to a cooling fluid outlet header 46 in the upper part thereof. As shown in FIG. 5 the cooling tubes 44 are substantially uniformly distributed over the cross section of the vessel 40. The cooling tubes 44 are fitted in openings in tube sheets 47 and 48, forming boundaries of the inlet header 45 and outlet header 46, respectively. For dismantling purposes the cooling tubes 44 are preferably detachably secured to at least one of said tube sheets 47 and 48.

A plurality of vertically spaced apart box-like structures 49, supported by supporting rings secured to the side wall 43 of the vessel are arranged around the cooling tubes 44. For the sake of clarity only, two box-like structures 49 are shown in FIG. 4. Each box-like structure 49 can be considered as a group of horizontally disposed distillation units cooperating with the cooling tubes 44, as will be discussed in more detail hereinafter. The interior of each box-like structure 49 forms a collecting zone 50 for liquid to be distilled. Between each pair of box-like structures 49 two walls 51 and 52 are positioned. The space between each box-like structure 49 and a next lower wall 51 forms a zone 53 for residue. The spaces between each set of horizontal walls 51 and 52 are distillate receiving zones, indicated with reference numeral 54. Distillate from the lowermost distillation units is collected onto the tube sheet 47 of the cooling fluid inlet header 45.

The vessel wall is provided with a plurality of inlets 55 for the supply of liquid to be distilled, each inlet communicating with the interior of a box-like structure 49. As clearly shown in the FIGS. 4 and 5 the box-like structures 49 have cylindrical openings that form hollow elements 56 around the cooling tubes 44, which hollow elements can be compared with the hollow elements shown in the previous figures. A plurality of groups of tangentially disposed passages 57 are arranged in the upper part of each box-like structure 49 for tangentially directing liquid from the interior of the box-like structures 49 into the interior of the hollow elements 56. Each group of passages 57 is preferably substantially uniformly distributed around a hollow element 56, in order to promote a uniform distribution of liquid over the inner surfaces of said elements. As shown in FIG. 4, the lower parts of the hollow elements 56 are enlarged to enable an easy outflow of nondistilled liquid into the residue zones 53. To prevent the escape of non-distilled residue along the cooling tubes 44, the walls 51 are provided with upwardly extending tubular members 58, having then upper ends preferably arranged at or near the lower ends of the box-like structures 49.

Formed distillate and residue can be discharged from the vessel via outlets 59 and outlets 60, respectively.

In order to prevent leakage of liquid between the tube sheet 47 and 48 and the cooling tubes 44 which pass through openings in said walls, care must be taken that the cooling tubes 44 are secured in a fluid tight manner to the tube sheets. It may, for example, be advisable to arrange gaskets around the cooling tubes 44 at those locations where they pass through the openings in the tube sheets.

For depressurizing the interior of the vessel a tubular member 61 is provided, which member is connected to pumping means (not shown). To enable an evacuation of the whole vessel via a single number 61, passages 62 are provided between the walls 52 and the vessel side wall 43.

During operation of the vessel shown in FIG. 4 for distilling liquid, cooling fluid is circulated through the vessel from the inlet header 45, via the cooling tubes 44 into the outlet header 46. Cooling fluid discharged from vessel 40 may be recirculated to the inlet header 45 for reuse after having passed a heat exchanger (not shown). Hot liquid to be distilled is introduced into the box-like structures 49 via the liquid inlets 55. The tangentially disposed passages 57 force the liquid to flow in the form of thin liquid films along the inner surfaces or evaporator surfaces of the hollow elements 56. The vaporous components in the liquid will escape from the generated liquid films and will pass towards the cooling surfaces formed by the cooling tubes 44, on which the vapor subsequently condenses. The condensed vapor, i.e., the distillate, will flow along the cooling tubes 44 and be collected on a tray 52 and the lowermost wall 47 in the bottom part of the vessel 40 and is subsequently removed from the vessel via the distillate outlets 59. The residue flowing along the inner surfaces of the hollow elements 56 is collected in the zones 53 and discharged from the vessel via the residue outlets 60.

Dismantling of the vessel for inspection or maintenance can be easily accomplished by removing the vessel top wall 41 and the vessel bottom wall 42, disconnecting the cooling tubes 44, lifting the cooling fluid tube sheet 48 and the cooling tubes 44, either together or separately, from the vessel. Hereafter the box-like structures 49 and the walls 51 and 52 can be easily removed from the vessel.

It should be noted that although only two layers of distillation are shown in FIG. 4, the vessel 40 may be provided with any number of distillation unit layers. The hollow elements 56 may be further provided with means, for example coiled tubes, for increasing the surface area of the inner or evaporator surfaces of said elements. These surface area increasing means may be combined with means for heating the evaporator surfaces, which latter heating means may also be separately applied, as discussed in the above with reference to FIG. 3.

Although FIG. 4 shows a distillation apparatus in which each residue zone and each distillate zone is provided with a separate outlet, it is also possible to collect the residue/distillate from the various residue/distillate zones in the vessel and to apply a single residue outlet and single distillate outlet for discharging the residue/distillate from the vessel.

Especially when very viscous liquids are to be treated, the residue zone(s) and the distillate zone(s) should preferably be slightly inclined towards the respective outlets in order to obtain an easy outflow of residue and distillate during operation of the vessel.

The vessel shown in FIG. 4 may be used to process a liquid in such a manner that more than one distillate fraction is obtained. In this case, the evaporator surfaces of the various distillation unit layers are, for example, maintained at different temperature levels.

Although the hollow elements 17 and 56 shown in the drawings are substantially cylindrical, it is also possible to use hollow elements with a different shape, for example, hollow elements which slightly taper in upward direction. It should, however, be noted that the hollow elements should preferably be provided with substantially rotation-symmetrical inner surfaces forming the evaporator surfaces. Instead of the arrangement of the residue zones as shown in the figures, the hollow elements themselves may be so constructed as to form a collecting area for residue. To this end the lower part of the hollow elements may, for example, be provided with an annular outwardly extending gutter forming the residue zone.

Although the figures show vessels in which the distillation units and the liquid zones are arranged it should be noted that the enclosure of these units and spaces can also be formed by cylindrical walls arranged between the various horizontal walls. Such walls are preferably detachably secured to the horizontal walls so that the so-formed installation can be easily dismantled. The application of separate cylindrical walls between each pair of horizontal walls enables removal of the various internals in lateral direction.

What is claimed is:

1. An apparatus for fractional distillation under vacuum comprising:
   a vertical evacuable vessel, said vessel being divided into a first zone for liquid to be distilled, a second zone for distillate and a third zone for residue;
   inlet means for supplying liquid to be distilled to said first zone;
   first and second outlet means for discharging distillate from said second zone and residue from said third zone, respectively;
   a plurality of substantially parallel vertical cylindrical elements positioned within said vessel, the cylindrical wall of the element forming an evaporation surface;
   flow directing means disposed in the vessel for directing fluid from the first zone to the upper part of the evaporative surface of each cylindrical element;
   a plurality of cooling surfaces having means for circulating cooling fluid therethrough, said cooling surfaces extending at least part way through each of said cylindrical elements; and
   means associated with each cylindrical element for separately discharging the distillate and residue from said cylindrical element to said second and third zones, respectively.

2. Apparatus as claimed in claim 1, wherein the vessel is formed by an enclosure consisting of detachably interconnected wall parts.

3. Apparatus as claimed in claim: 1 or 2, wherein the flow directing means comprises a substantially tangentially disposed inlet in the side wall of the cylindrical element for giving a whirling motion to the liquid along the inner surface of said side wall.

4. Apparatus as claimed in claim 3, wherein each cylindrical element is provided with a plurality of substantially tangentially disposed inlets substantially uniformly distributed around the periphery of its side wall.

5. Apparatus as claimed in claim 1 or 2, wherein each cylindrical element is provided with a top wall having an inlet opening and a deflecting element downstream of said opening for directing liquid to be distilled towards the inner surface of its side wall.

6. Apparatus as claimed in claim 5, wherein each inlet opening and deflecting element are substantially concentrically arranged with respect to each cylindrical element.

7. Apparatus as claimed in claim 6, wherein the deflecting elements are substantially conically shaped.

8. Apparatus as claimed in claim 1 or 2, wherein the inner surfaces of the side walls of the cylindrical elements are provided with inwardly extending protrusions that increase the surface area of the cylindrical element.

9. Apparatus as claimed in claim 8, wherein the protrusions are formed by helically wound coils.

10. Apparatus as claimed in claim 1 or 2, further comprising means for heating the side walls of the cylindrical elements.

11. Apparatus as claimed in claim 10, wherein the heating means are arranged at the inner surfaces of the side walls of the cylindrical elements.

12. Apparatus as claimed in claim 11, wherein the heating means are formed by helically wound heating coils.

13. Apparatus as claimed in claim 1 or 2, wherein the cooling surfaces form part of tubular elongated elements provided with means for circulating a cooling fluid therethrough.

14. Apparatus as claimed in claim 1 or 2, and in addition a plurality of boundary walls, each cylindrical element being provided with the upper ends of the boundary walls at its lower end for directing distillate from its interior into the second zone and residue into the third zone.

15. Apparatus as claimed in claim 1 or 2, wherein said cylindrical elements are mounted in openings in a first substantially horizontal detachably mounted wall, separating the first zone from the third zone.

16. Apparatus as claimed in claim 14, wherein the boundary walls are mounted in openings of a second detachably mounted wall separating the second zone from the third zone.

* * * * *